(12) United States Patent
Krzywon

(10) Patent No.: US 11,821,325 B2
(45) Date of Patent: Nov. 21, 2023

(54) SYSTEM AND METHOD FOR DETECTING FAILURE OF A PROPELLER CONTROL UNIT

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 223 days.

(21) Appl. No.: 17/163,854

(22) Filed: Feb. 1, 2021

(65) Prior Publication Data

US 2022/0243610 A1 Aug. 4, 2022

(51) Int. Cl.

| | |
|---|---|
| *F01D 21/04* | (2006.01) |
| *B64C 11/30* | (2006.01) |
| *B64C 11/40* | (2006.01) |
| *B64C 11/38* | (2006.01) |
| *F03D 17/00* | (2016.01) |
| *B64D 45/00* | (2006.01) |

(52) U.S. Cl.
CPC ............ *F01D 21/04* (2013.01); *B64C 11/301* (2013.01); *B64C 11/385* (2013.01); *B64C 11/40* (2013.01); *F03D 17/00* (2016.05); *B64D 2045/0085* (2013.01); *F05B 2260/80* (2013.01); *F05D 2260/80* (2013.01); *F05D 2270/09* (2013.01)

(58) Field of Classification Search
CPC . F01D 21/003; F01D 7/00; F01D 7/02; F05D 2260/80; F03D 17/00; F05B 2260/80; B64C 11/301; B64C 11/303; B64C 11/38; B64C 11/385; B64C 11/40; B64D 2045/0085; B64D 45/00
See application file for complete search history.

(56) References Cited

U.S. PATENT DOCUMENTS

| | | | | |
|---|---|---|---|---|
| 2,934,154 A | * | 4/1960 | Chilman | B64C 11/385 416/61 |
| 3,115,937 A | * | 12/1963 | Biermann | B64C 11/385 416/46 |
| 5,284,418 A | * | 2/1994 | Moriya | B64C 11/44 701/99 |
| 6,059,528 A | * | 5/2000 | Danielson | B64C 11/40 416/61 |

(Continued)

*Primary Examiner* — Christopher Verdier
(74) *Attorney, Agent, or Firm* — NORTON ROSE FULBRIGHT CANADA LLP

(57) ABSTRACT

A failure detection method and system for a propeller control unit coupled to a propeller are provided. An actual value of a blade angle and/or a rotational speed of the propeller are obtained. A comparison between the actual value and a threshold is performed. In response to determining, based on the comparison, that the actual value exceeds the threshold, the propeller control unit is caused to adjust the blade angle to bring the blade angle and/or the rotational speed towards the threshold. A subsequent actual value of the blade angle and/or the rotational speed is obtained. From the subsequent value, it is determined whether the blade angle and/or the rotational speed has been brought towards the threshold. In response to determining that the blade angle and/or the rotational speed has failed to be brought towards the threshold, failure of the propeller control unit is detected and an alert is output.

20 Claims, 7 Drawing Sheets

(56) References Cited

U.S. PATENT DOCUMENTS

| | | | | |
|---|---|---|---|---|
| 6,077,040 | A * | 6/2000 | Pruden | B64C 11/38 |
| | | | | 416/157 R |
| 7,873,445 | B2 * | 1/2011 | Schaeffer | B64C 29/0033 |
| | | | | 701/16 |
| 2016/0333730 | A1 * | 11/2016 | Duke | B64F 5/60 |
| 2018/0237125 | A1 * | 8/2018 | Lisio | B64C 11/303 |
| 2020/0283124 | A1 * | 9/2020 | Zakucia | B64C 11/303 |
| 2021/0009252 | A1 * | 1/2021 | Forte | B64C 11/305 |
| 2021/0009278 | A1 * | 1/2021 | Forte | B64C 11/305 |

* cited by examiner

SYSTEM AND METHOD FOR DETECTING FAILURE OF A PROPELLER CONTROL UNIT

TECHNICAL FIELD

The application relates generally to aircraft engines, and, more particularly, to propeller controllers of propeller-driven aircraft engines.

BACKGROUND OF THE ART

Certain aircraft engines are mechanically coupled to propellers, which produce thrust to propel the aircraft. A propeller control unit provided for use with the propeller serves to effect control of the operation of the propeller, including to control pitch angles of the blades of the propeller, and to control the rotational speed of the propeller. The propeller control unit is actuated by way of a hydraulic fluid, which is supplied under pressure to achieve target values of propeller speed and blade angle.

Because a malfunction of the propeller control unit could create a risk to aircraft safety, there is a need for systems and methods for detecting failure of a propeller control unit used in a propeller-driven aircraft engine.

SUMMARY

In one aspect, there is provided a failure detection method for a propeller control unit coupled to a propeller. The method comprises, at a computing device, obtaining an actual value of at least one of a blade angle and a rotational speed of the propeller, performing a comparison between the actual value and a threshold, in response to determining, based on the comparison, that the actual value exceeds the threshold, causing the propeller control unit to adjust the blade angle to bring the at least one of the blade angle and the rotational speed towards the threshold, obtaining a subsequent actual value of the at least one of the blade angle and the rotational speed, determining, from the subsequent value, whether the at least one of the blade angle and the rotational speed has been brought towards the threshold, and, in response to determining that the at least one of the blade angle and the rotational speed has failed to be brought towards the threshold, detecting failure of the propeller control unit and outputting an alert.

In another aspect, there is provided a failure detection system for a propeller control unit coupled to a propeller. The system comprises a processing unit and a non-transitory computer readable medium having stored thereon program code executable by the processing unit for obtaining an actual value of at least one of a blade angle and a rotational speed of the propeller, performing a comparison between the actual value and a threshold, in response to determining, based on the comparison, that the actual value exceeds the threshold, causing the propeller control unit to adjust the blade angle to bring the at least one of the blade angle and the rotational speed towards the threshold, obtaining a subsequent actual value of the at least one of the blade angle and the rotational speed, determining, from the subsequent value, whether the at least one of the blade angle and the rotational speed has been brought towards the threshold, and, in response to determining that the at least one of the blade angle and the rotational speed has failed to be brought towards the threshold, detecting failure of the propeller control unit and outputting an alert.

In a further aspect, there is provided a non-transitory computer-readable medium having stored thereon program instructions executable by a processor for failure detection for a propeller control unit coupled to a propeller. The program instructions are configured for obtaining an actual value of at least one of a blade angle and a rotational speed of the propeller, performing a comparison between the actual value and a threshold, in response to determining, based on the comparison, that the actual value exceeds the threshold, causing the propeller control unit to adjust the blade angle to bring the at least one of the blade angle and the rotational speed towards the threshold, obtaining a subsequent actual value of the at least one of the blade angle and the rotational speed, determining, from the subsequent value, whether the at least one of the blade angle and the rotational speed has been brought towards the threshold, and, in response to determining that the at least one of the blade angle and the rotational speed has failed to be brought towards the threshold, detecting failure of the propeller control unit and outputting an alert.

DESCRIPTION OF THE DRAWINGS

Reference is now made to the accompanying figures in which.

It will be noted that throughout the appended drawings, like features are identified by like reference numerals.

DETAILED DESCRIPTION

There is described herein systems and methods for detecting failure of a propeller control unit (PCU) of an aircraft, and more specifically for detecting that a blade angle actuator of the PCU is seized in a position where fluid is supplied to the propeller.

Figure 1:
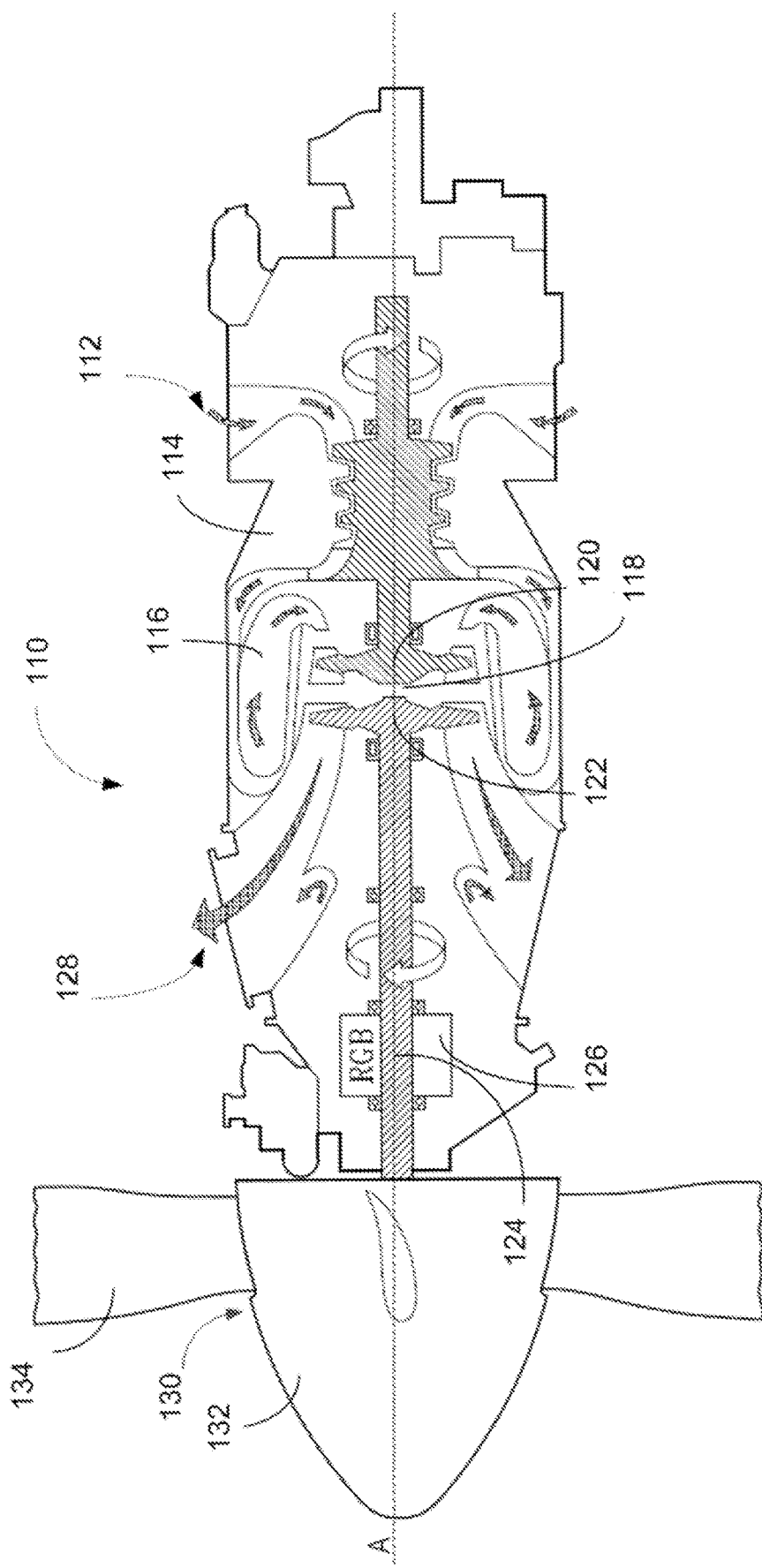
FIG. 1 is a schematic cross-sectional view of an engine, in accordance with an illustrative embodiment.

The aircraft is equipped with at least one engine, such as the exemplary engine 110 depicted in FIG. 1. In one embodiment, the engine 110 is a gas turbine engine of a type typically provided for use in subsonic flight. In this embodiment, the engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and is coupled with a reduction gearbox (RGB) 126. The power turbine 122 rotatingly drives a rotor shaft (also referred to herein as a propeller shaft or an output shaft) 124 about a propeller shaft axis 'A' through the RGB 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to the hub 132 by any suitable means and extending radially therefrom. The blades 134 are also each rotatable about their own radial axes through a plurality of adjustable blade angles. As used herein, the term "blade angle" (also referred to as the "pitch angle" or "pitch") refers to the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full (or maximum) reverse, and forward thrust. The blade angles can be changed, to achieve a given mode of operation. Depending on the mode of operation, the blade angle may be positive or negative: the feather and forward thrust modes are associated with positive blade angles, and the full reverse mode is associated with negative blade angles.

The propeller 130 converts rotary motion from the engine 110 to provide propulsive force to the aircraft (also referred to herein as thrust). In one embodiment, the propeller 130 is a constant speed variable pitch propeller, meaning that the propeller 130 is designed to have its blade angle automatically changed to allow it to maintain a constant rotational speed (also referred to herein as a "reference speed"), regardless of the amount of engine torque being produced, the speed of the aircraft, or the altitude at which the aircraft is flying. Other configurations for a turboprop engine may also apply.

Although the examples illustrated herein show a turboprop engine, it will be understood that the methods and systems described herein may be applied to other propeller-based engines, such as piston engines, electrical engines, and the like. It should also be understood that the engine 110 may be any suitable aircraft propulsion system, and may include in some embodiments an all-electric propulsion system or a hybrid-electric propulsion system having a propeller driven in a hybrid architecture (series, parallel, or series/parallel) or turboelectric architecture (turboelectric or partial turboelectric). In addition, it will be understood that the engine 110 may be found in aircraft as well as in other industrial applications, including, but not limited to, wind power turbines and ship propulsion and gas or electric power generators.

Figure 2:
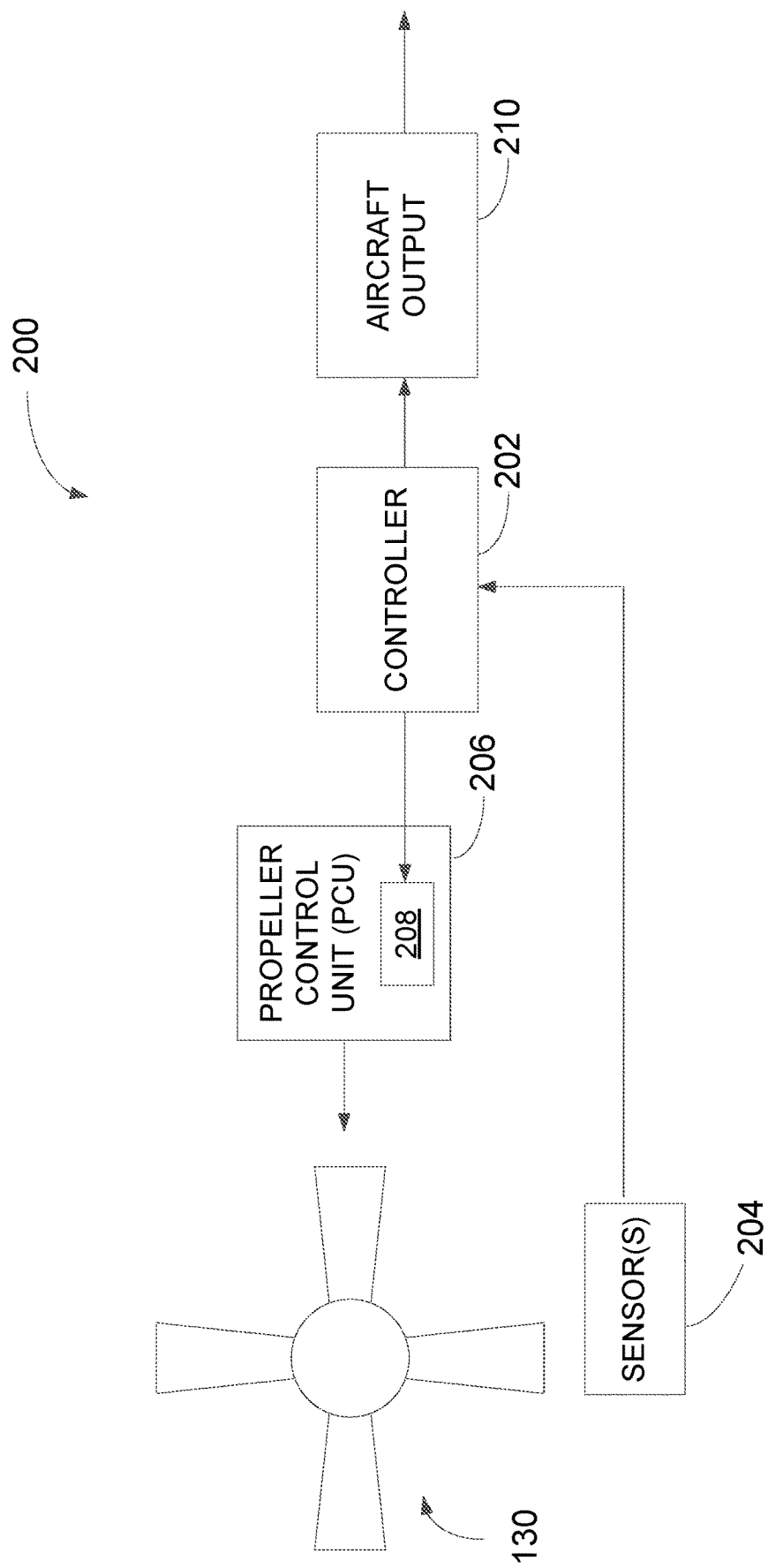
FIG. 2 is a schematic diagram of an example embodiment of a propeller control assembly for the engine of FIG. 1, in accordance with an illustrative embodiment.

Referring now to FIG. 2 in addition to FIG. 1, there is illustrated an example embodiment of a propeller control assembly 200. A controller 202 receives, from one or more sensors 204, one or more input signals (referred to herein as "sensor signal(s)"). In the embodiment illustrated in FIG. 2, the sensor(s) 204 are shown as being positioned adjacent (i.e. coupled to) the propeller 130. Although not illustrated in FIG. 2, it should be understood that the sensor(s) 204 may also be coupled to the engine 110. The sensor signal(s) comprise measurements of one or more parameters for use in controlling the engine 110 and/or propeller 130. The sensor signal(s) received from the sensor(s) 204 can be electrical signal(s), digital or analog, or any other suitable type of signal.

The sensor(s) 204 may comprise one or more speed sensors configured to acquire measurement(s) of the actual (or current) value of the rotational speed (Np) of the propeller 130. The sensor(s) 204 may also comprise one or more accelerometers configured to acquire measurement(s) of the actual value of the acceleration of the propeller 130. The speed and/or acceleration measurement(s) acquired by the sensor(s) 204 are then provided to the controller 202. It should however be understood that, in some embodiments, rather than being directly received at the controller 202 from the sensor(s) 204, the propeller speed may be calculated based on one or more other engine and/or aircraft parameters measured using the sensor(s) 204.

The sensor(s) 204 are also configured to measure the actual value of the blade angle of the propeller 130 and to provide this measurement to the controller 202. In one embodiment, the sensor(s) 204 comprise one or more sensors configured to magnetically detect the passing of position markers provided on a feedback device (not shown). In one embodiment, the feedback device is operatively coupled to the propeller 130 and configured to rotate with the propeller 130 about the axis A and to move axially along the axis A with adjustment of the propeller blade angle. In one embodiment, the sensor(s) 204 are fixedly mounted to a static portion of the engine 110. In other embodiments, the sensor(s) 204 are mounted for rotation with propeller 130 and to move axially with adjustment of the blade angle of the blades 134 of the propeller 130, and the feedback device is fixedly mounted to a static portion of the engine 110. Detection of the position of the markers near the sensor(s) 204 in turn provides, based on the markers' physical geometry, an indication of the position of the feedback device and an indication of the propeller blade angle. It should be understood that, in some embodiments, a single sensor 204 may be used to obtain the propeller blade angle measurements and the propeller speed measurements. Indeed, the same sensor signal may be used to determine the propeller speed and the position of the feedback device, which in turn indicates the propeller blade angle. More specifically, in some embodiments, the frequency of the sensor signal may be used to determine the propeller speed and the phase of the sensor signal may be used to determine the position of the feedback device and calculate the propeller blade angle.

In some embodiments, the sensor(s) 204 produce a signal pulse in response to detecting the presence of a position marker in a sensing zone of the sensor 204. The signal pulses produced by the sensor 204 can then be used to determine various operating parameters of the engine 110 and the propeller 130, e.g. a blade angle and/or a rotational speed of the propeller 130. For example, the sensor 204 may be an inductive sensor that operates on detecting changes in magnetic flux, and may have a sensing zone which encompasses a circular or rectangular area or volume in front of the sensor 204. The position markers provided on the feedback device may then be made of any suitable material which would cause the passage of the position markers near the sensor(s) 204 to provide a change in magnetic permeability within the magnetic field generated by the sensor 204. When a position marker is present in the sensing zone, or passes through the sensing zone during displacement of the feedback device, the magnetic flux in the sensing zone is varied by the presence of the position marker (in other words, a change in magnetic permeability occurs), and the sensor(s) 204 can produce a signal pulse, which forms part of the sensor signal.

Parameters characterizing the sensor signal(s) are decoded by the controller 202 (e.g. to provide the signal frequency, phase, amplitude) for estimation of the propeller speed and blade angle. It should however be understood that the sensor 204 may be any suitable sensor other than an inductive sensor, including, but not limited to, a Hall sensor and a variable reluctance sensor.

Based on the sensor signal(s) received from the sensor(s) 204, the controller 202 regulates, via a PCU 206, the flow of fluid (e.g., oil) to the propeller 130 in accordance with a reference rotational speed to which the propeller 130 is to be set (or equivalently in accordance with a pre-determined propeller blade angle threshold). In other words, the flow of fluid is regulated to maintain the propeller 130 at the reference speed (or to prevent the propeller 130 from operating at a blade angle exceeding the blade angle threshold). The reference speed (and/or the blade angle threshold) is pre-determined and may be obtained by any suitable means, e.g. retrieved from a database, a memory, or other storage medium to which the controller 202 may be communicatively coupled. The value of the reference speed (and/or blade angle threshold) may depend on engine and propeller configuration and is illustratively set to protect the engine 110 from overspeeding. In one embodiment, the most optimal operating speed for operation of the propeller 130 and of the engine 110 is set as the value of the reference speed.

Indeed, when the propeller's actual speed deviates from the reference speed (or exceeds the blade angle threshold), as determined by the controller 202 based on the received sensor signal(s), the controller 202 responds with a change in blade angle and commands the PCU 206 to direct fluid under pressure to the propeller 130 or to release (i.e. remove) fluid from the propeller 130. The change in fluid volume going to the propeller 130 governs operation of the propeller 130, and more specifically causes a change in propeller blade angle, which in turn affects the rotational speed of the propeller 130. Indeed, as known to those skilled in the art, rotational speed of the propeller 130 is set via modulation of an angle of the blades 134. Fining (i.e. decreasing) the blade angle results in a propeller speed increase and coursing (i.e. increasing) the blade angle results in a propeller speed decrease. For example, increasing the fluid flow (i.e. supplying fluid) to the propeller 130 causes the propeller blades 134 to transfer to a lower pitch angle such that, when the propeller 130 is operating in a forward (i.e., positive) range of pitch angles, the propeller 130 experiences acceleration (i.e., an increase in rotational speed). By way of another example, decreasing the oil flow to (i.e. draining fluid from) the propeller 130 causes the propeller blades 134 to transfer to a higher pitch angle so that, when the propeller 130 is operating in a forward (i.e., positive) range of pitch angles, the propeller 130 experiences deceleration (i.e., a decrease in rotational speed).

More specifically, in one embodiment, the controller 202 transmits a signal or command (also referred to herein as a "PCU command") to the PCU 206, which in turn responds by regulating fluid flow to and from the propeller 130. As discussed further herein, the PCU command may also be generated using any suitable means. The PCU 206 illustratively regulates fluid flow to and from the propeller 130 via an actuator (also referred to as a "pitch angle actuator" or a "blade angle actuator") 208, which is controlled by the controller 202 via the PCU command. The fluid illustratively flows from a fluid source (e.g., a source of oil) provided on the aircraft (e.g. from the engine oil system or from an oil pump of the PCU 206). The actuator 208 can be actuated between a closed position, in which fluid is drained from the propeller 130, and an open position, in which fluid is supplied to the propeller 130, where increasing or decreasing the degree to which the actuator 208 is opened increases or decreases the pressure of the fluid delivered to the propeller 130. Actuation of the actuator 208 therefore selectively allows or prevents fluid flow to and from the propeller 130 and adjusting the position of the actuator 208 may be used to modulate the flow of fluid (i.e. control the rate at which fluid flows) to the propeller 130.

In one embodiment, the actuator 208 is an Electrohydraulic Servo Valve (EHSV) and the controller 202 is configured to output the PCU command that determines a governing current of the EHSV. The governing current governs the opening of the EHSV for controlling the flow of fluid from the fluid source to the propeller 130. In one embodiment, a positive governing current commands oil supply and a negative governing current commands oil drain. In some embodiments, the controller 202 may be configured to set minimum and maximum governing currents for the EHSV, as well as absolute rates of change of the governing current. While the actuator 208 is described herein with reference to an EHSV, it should however be understood that the PCU 206 may include any suitable component, and any suitable arrangement of components, for regulating fluid flow to and from the propeller 130. In some embodiments, a hydro-mechanical system configured to regulate fluid flow to and from the propeller 130 may be used instead of an EHSV. For example, the hydro-mechanical system may incorporate a set of valves, an overspeed governor, pitch lock mechanism(s), and a mechanical beta system configured to be mechanically actuated (for allowing a reverse range of propeller blade angles) by a Power Lever Angle (PLA) lever mechanically coupled to the beta system. In such embodiments, it may be desirable to provide an electronic control system as a secondary (or back-up) system that monitors propeller speed and blade angle in order to protect the aircraft from unsafe conditions in the event of failure of the primary mechanical system (e.g. due to the PLA lever inadvertently allowing reverse operation in flight or to the overspeed governor failing to react to propeller overspeed). Upon detection of the primary (mechanical) system being inoperable, the secondary electronic system may be configured to provide a suitable accommodation including, but not limited to, activating an independent valve that would initiate the drain of fluid from the propeller 130, or initiating engine shutdown, which would stop fluid flow to and from the propeller 130 and allow for the propeller 130 to be feathered at a slow rate.

It should be understood that any suitable actuating system operable to modulate fluid flow (received from the fluid source) to a desired outflow may be used to regulate fluid flow to and from the propeller 130. In such embodiments, it may be desirable for the actuating system to be operable to supply or drain the entirety or any portion of the received fluid flow. Possible modulating systems include, but are not limited to, electrically-controlled oil pumping systems and electrically-controlled fluid drain control systems. In some embodiments, the actuator 208 may be a mechanical pump which, depending on its drive, provides more or less fluid flow to the downstream system (i.e. to the propeller 130). Alternatively, a set of mechanical valves, which may be operable to bypass (e.g. into the inlet of the PCU fluid pump) a received fluid flow in order to achieve a desired fluid outflow for maintaining the propeller 130 at the reference speed or at a desired propeller blade angle, may be used.

Still referring to FIG. 2, the controller 202 is configured to detect a failure of the PCU 206 (i.e. PCU seizure at oil delivery to the propeller dome) on the basis of the PCU command and of the input signal(s) received from the sensor(s) 204. In particular, the controller 202 is configured to detect, based on a reading of the propeller speed and/or blade angle, that the blade angle actuator 208 of the PCU 206 is seized at the open position where pressurized fluid is supplied to the propeller 130. Such a condition can be a result of various types of failures including, but not limited to, failure of the overall propeller control system (e.g., loss of connectivity between the actuator 208 of the PCU 206 and the controller 202, which systems upon failure lose the ability to restrict oil pressure to the propeller 130).

Failure of the modulating system used to regulate fluid flow to and from the propeller 130 (i.e. failure of the PCU 206), which may cause an unrestricted fluid flow to the propeller 130, is recognized to result in an inability to control the propeller speed and blade angle, therefore creating a risk of propeller operation at undesirable speeds or blade angles. In some cases, failure (i.e. seizure in the open position) of the blade angle actuator 208 may result in an uncontrollable flow of fluid to the propeller dome, which may result in a reduction in the propeller blade angles and in the blades (reference 134 in FIG. 1) of the propeller 130 moving from the high-pitch angle consequent to feathering up to the lowest pitch.

In the event of a loss of control over the propeller operation, it is desirable to implement an accommodation procedure. Since the propeller speed would exceed the predefined speed limits, the accommodation procedure may in some embodiments include triggering a propeller overspeed protection system. Also, since the propeller blade angle could exceed the predefined blade angle thresholds set to protect from propeller induced excessive drag or braking force acting on the airplane, the accommodation procedure may include triggering a protective device implemented to protect from excessive drag. Protective reactions to the propeller exceedance of thresholds in speed and/or blade angle may include a protective propeller feather or a pilot commanded engine shutdown with initiated propeller feather. In one embodiment, the systems and methods described herein are applicable to aircraft that use electrical power to activate the protection system.

Propeller systems typically incorporate means to maintain the propeller (as in propeller 130) in the feather position, such as through the electrically commanded drain of oil from the propeller system triggered in the engine shutdown process. Due to the risk of the propeller 130 coming out of the full feather position (thus creating undesired drag acting on the aircraft), it is desirable for the commanded fluid drain from the propeller 130 to remain activated until completion of flight. In the event of a loss of command and/or actuation of the system for fluid drain from the propeller 130 with the engine 110 being shut down, a windmilling force acting on the engine compressor becomes a driving source for rotation of the engine 110, which, in turn, may drive engine accessories (e.g., the main oil pump). The engine 110 driven by the windmilling force also drives the power turbine (reference 122 in FIG. 1) to a certain speed. As the engine 110 and the accessories driven by the accessory gearbox and by the RGB (reference 124 in FIG. 1) begin to rotate, fluid (e.g., oil) starts flowing. In a failure scenario where the upstream fluid flow is not restricted by the actuator 208 of the PCU 206, fluid (e.g., oil) circulating is not prevented from reaching the propeller 130.

The fluid reaching the propeller 130, increases the fluid pressure in the propeller 130, which causes the propeller 130 to come out of the feather position. As the process of coming out of the feather position causes the propeller 130 to operate towards lower blade angles, the propeller 130 starts accelerating which further increases the drive at the RGB 124 and at all the driven accessories. Acceleration of the driven accessories, including the PCU fluid pump (or main oil pump) 130 causes a further increase in the pressure of the fluid delivered to the propeller 130, resulting in the propeller 130 being inadvertently transferred further out of feather towards lower angles and therefore resulting in the propeller 130 further accelerating. Due to this self-feeding process, the propeller 130 may be driven to the reverse range of blade angles and the engine 10 may be caused to operate outside of a safe operating envelope, experiencing overspeed conditions and/or excessive acceleration, and the like. In embodiments where no means of stopping the circulation of fluid in the engine system being shut down is provided, the pilot would not be able to react (despite a warning message of the propeller 130 entering an unsafe range in proximity of the reverse range of blade angles being displayed to the crew) since no means would be available for preventing further transition of the propeller 130 towards low blade angles (i.e., towards the reverse range). In order to prevent this from occurring, systems and methods for detecting failure of the PCU 206, and more specifically for detecting that the blade angle actuator 208 of the PCU 206 is seized in a position where fluid is supplied to the propeller 130, are provided herein.

As will be discussed further below, the controller 202 monitors the input signal(s) received from the sensor(s) 204 and, upon detection of at least one operating parameter of the propeller 130 (i.e. the propeller blade angle and/or rotational speed) exceeding a pre-determined threshold (in terms of blade angle and/or rotational speed), adjusts the PCU command to bring the at least one operating parameter towards the threshold. The controller 204 further monitors the input signal(s) received from the sensor(s) 204 and, upon detection that the at least one operating parameter of the propeller 130 has not been brought towards the threshold and still exceeds it, detects failure of the PCU 206, and more particularly of the blade angle actuator 208.

In some embodiments, in the event of failure of the PCU 206, a protective propeller feather procedure may be automatically triggered by a dedicated protection system (not shown) or by an embedded protection functionality of the controller 202. In one embodiment, the protective propeller feather procedure entails actuating a drain valve (not shown) operatively coupled to the propeller 130, the drain valve being independent from the blade actuator 208. Actuation of the drain valve (e.g., through an actuation command or current) drives the propeller 130 towards feather. In one embodiment, it is desirable for the actuation command or current to be continuously provided in order for the protection functionality to remain active (for fluid drainage). Thus, in one embodiment, a power source is needed for the controller 202 to perform electronic control over the actuator 208 and for the protection system (dedicated or implemented as a protection functionality embedded within the controller 202) to perform electronic control over the opening of the drain valve. Functionalities of the controller 202 and of the protection system are therefore dependent on the electrical power supply that may be common for both systems (e.g. provided by the engine driven generator, or derived from the aircraft battery). Detection of the failure of the PCU 206 (particularly of the blade angle actuator 208 being seized in a position where fluid is supplied to the propeller 130), followed by a protective reaction of the propeller 130, is therefore indicative of the aircraft entering unsafe flight conditions, which rely on the availability of electrical power to avoid potentially catastrophic risks for flight safety.

In some embodiments and as will be discussed further below, the controller 202 is configured to generate and output an alert upon detection of the failure of the PCU 206. In one embodiment, the alert is a warning indication or message that is output for annunciation in the aircraft cockpit in order to inform the crew of the PCU failure (i.e. of the blade angle actuator 208 being seized at the open position).

The pilot and/or crew may in turn take over control of the aircraft and take appropriate action by applying a specific procedure to protect the aircraft from unsafe flight conditions that can be induced by the PCU failure (i.e. by the malfunction of the blade angle actuator 208, which is seized in a position where fluid is supplied to the propeller dome). In particular, as electrical power has to be available in order for the protection functionality (described above) to be maintained in the event of a failure scenario, the alert provides a warning indication to the crew on the necessity for maximizing the availability of electrical power and the pilot and/or crew may then take appropriate measures. For example, the pilot may try to maintain engine power (e.g., be advised to hold the engine power at idle). Alternatively, when engine shut down is a necessary action, the pilot may be made aware of the need to land the aircraft as soon as possible in order to prevent the unsafe effects of the PCU failure from occurring during flight. In particular, in single engine applications, upon engine shutdown, the aircraft battery becomes the source of power to the engine 10 and an immediate landing may therefore be needed to prevent depletion of the aircraft battery in flight.

Figure 3:
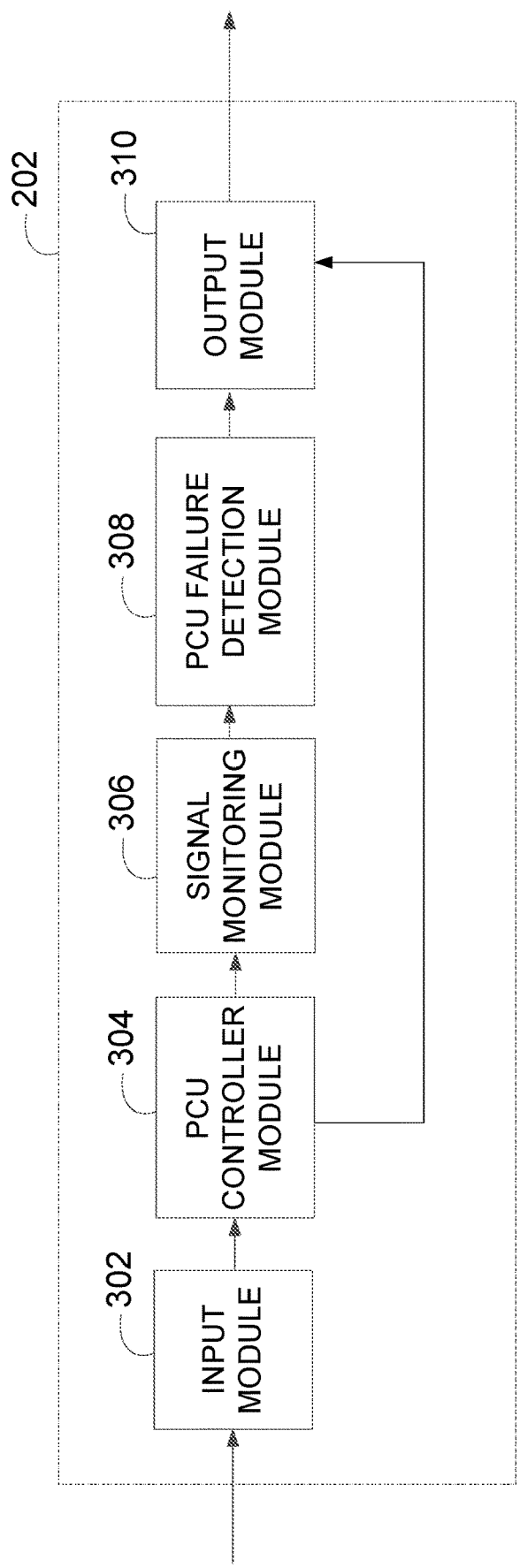
FIG. 3 is a block diagram of the controller of FIG. 2, in accordance with an illustrative embodiment.

Referring to FIG. 3, there is illustrated an example embodiment of the controller 202. The controller 202 may be an Engine & Propeller Electronic Control (EPEC) system, an engine controller, such as a Full Authority Digital Engine Control (FADEC), an electronic propeller control system, an Engine Electronic Control (EEC), an Engine Control Unit (ECU), or the like. In the embodiment illustrated in FIG. 3, the controller 202 comprises an input module 302, a PCU controller module 304, a signal monitoring module 306, a PCU failure detection module 308, and an output module 310.

As previously noted and as will be discussed further below, the controller 202 is configured to detect malfunction of the blade angle actuator (reference 208 in FIG. 2) by monitoring the propeller speed and/or the propeller blade angle in relation to the PCU command. For this purpose, the input module 302 receives one or more input signals comprising an actual value of the propeller speed and/or propeller blade angle as obtained from measurements acquired by the sensor(s) (reference 204 in FIG. 2) coupled to the propeller 130 and/or engine 110. These input signal(s) are then provided to the PCU controller module 304 for processing.

The PCU controller module 304 is configured to generate and output the PCU command that would allow to achieve an expected propeller position or speed, based on the sensor signal(s) received from the input module 302. In particular, the PCU controller module 304 estimates the PCU actuator command (e.g., the EHSV governing current) that is needed to position the propeller blades (reference 134 in FIG. 1) at a different angle in order to maintain the propeller 130 at the reference speed (or equivalently the command needed to prevent the propeller 130 from exceeding specific thresholds of the propeller blade angle). The PCU controller module 304 may then send the PCU command to the output module 310 for transmission to the PCU actuator (reference 208 in FIG. 2), for use in adjusting the propeller blade angle and the propeller speed.

The sensor signal(s) and the PCU command may further be provided to the signal monitoring module 306, which is configured to confirm that the received signals are healthy. In particular, the signal monitoring module 306 is configured to assess whether the sensor signal(s) are within range and failure free. This may be achieved by the signal monitoring module 306 verifying the propeller speed and/or blade angle reading(s) from multiple sources. For example, the propeller control system may comprise a control system (referred to herein as a "propeller control system") configured to implement a control function for the propeller and a protection system (referred to herein as a "propeller protection system") configured to implement a protection function for the propeller. The propeller control system and the propeller protection system may be independent controllers, that may be configured to receive inputs on propeller speed and blade angle from independent, dedicated sensors (e.g., one sensor providing input to the propeller control system and one sensor providing input to the propeller protection system). It should however be understood that the propeller control system and the propeller protection system may be integrated in a single electronic unit.

In some embodiments, the propeller control system may have a dual channel configuration. Such a propeller control system may be configured to perform control over the propeller speed and blade angle with independence between the two channels (e.g., with each channel receiving signals from a dedicated sensor). It should be understood that both the propeller control system and the propeller protection system may have a single or dual channel configuration.

In one embodiment, the propeller protection system may receive the propeller speed and/or blade angle reading(s) from a dedicated sensor. Depending on configuration, the sensor may be equipped with a single coil (for single channel configuration) or with dual measuring coils (for dual channel configuration), with one coil used for reading and sending signals to each of two protection channels. The propeller control system may similarly receive the propeller speed and/or blade angle reading(s) from a dedicated sensor. Depending on configuration, the sensor may be equipped with a single coil (for single channel configuration) or with dual measuring coils (for dual channel configuration), with one coil used for reading and sending signals to each of two propeller control channels.

Redundancy in rotational speed and/or blade angle reading(s) by the two channels of the propeller protection system and by the propeller control system relying on the reading from another independent sensor allows for accommodation in case of detected deviation in propeller speed and/or blade angle reading. The deviation may be considered as a discrepancy between both readings of the control system performing the propeller control function and continuously monitoring the propeller speed and blade angle. The deviation may also be considered as a discrepancy between the control reading and the protection reading. Accommodation for the detected deviation may be designed as a selection logic where, in the event of multiple readings being available (e.g., two readings from both control channels and single or dual readings from the propeller protection system), a single outstanding reading would be considered as faulty and further propeller control would be performed in accordance to the other consistent readings.

The signal monitoring module 306 may consider a predetermined range of the propeller speed and/or blade angle as the propeller's operating range. As such, any propeller speed and/or blade angle reading that is out of the expected operating range would be considered by the signal monitoring module 306 as a faulty reading.

In addition, the signal monitoring module 306 may also consider the rate of change of the propeller speed and/or blade angle in relation to predefined criteria (or thresholds) that may be mechanically achievable by the propeller system. In other words, any propeller speed and/or blade angle reading that is beyond the expected rate of range in propeller speed and/or blade angle would be considered by the signal monitoring module 306 as indicative of a faulty reading.

The signal monitoring module 306 may also compare the propeller speed reading to an expected propeller speed, which may be estimated based on the measurement of the rotational speed of the engine power turbine (reference 122 in FIG. 1), which, as described herein above, drives the propeller shaft (reference 124 in FIG. 1) through the RGB (reference 126 in FIG. 1) or based on other engine operating parameters (e.g. allowing for the propeller control system to detect and accommodate for errors in propeller speed and/or blade angle reading by any channel when the propeller protection system described above is not implemented). Any propeller speed reading that deviates from the estimated propeller speed would be considered by the signal monitoring module 306 as a faulty reading.

The signal monitoring module 306 may also detect a lost or corrupted propeller speed and/or blade angle signal. In particular, a propeller speed and/or blade angle reading (i.e. signal) that is lost or deviates in a pre-defined manner (e.g., oscillating readings of excessive speed amplitude or intermittent loss) would be considered by the signal monitoring module 306 as a faulty reading.

The signal monitoring module 306 considers the propeller speed and/or blade angle reading as healthy if the readings are not detected as being faulty based on any of the pre-defined fault detection conditions described herein above (or by any other suitable condition defined in the signal monitoring module 306).

The signal monitoring module 306 is further configured to confirm that the PCU command (i.e. a current request to the actuator, reference 208 in FIG. 2) is healthy (i.e. failure-free). In one embodiment, the signal monitoring module 306 (or alternatively a separate PCU actuator controller) may be using feedback from the actuator 208 to control the governing current, and for fault detection of the PCU 206 and/or of the actuator 208. The signal monitoring module 306 performs continuous monitoring of the propeller speed and/or blade angle as well as of the PCU command. The monitoring of the PCU command may be performed after the PCU command is provided from the PCU controller module 304, thus allowing for monitoring of the feedback in relation to the provided command. In particular, the signal monitoring module 306 may be configured to compare the commanded governing current (e.g. by monitoring of the feedback current from the actuator 208 and/or PCU 206) to the maximum governing current. If the commanded governing current exceeds the maximum governing current, overcurrent is detected and the signal monitoring module 306 determines that the PCU command is faulty.

In some embodiments, errors in processing the PCU command by the actuator 208 may be detected upon receipt of an erroneous response to the provided governing current (e.g., a requested increase or decrease in PCU command for acceleration or deceleration of the propeller 130 failing to be followed by a propeller acceleration or deceleration, or by detecting that the time it takes for the propeller 130 to achieve the reference speed is longer than a maximum time required for executing the PCU command).

The signal monitoring module 306 may be configured to detect a lost, erroneous or corrupted commanded governing current (e.g., lost feedback, intermittent feedback reading, or mismatch between command and feedback). A PCU command and/or feedback that is lost or deviates in pre-defined manner (e.g. PCU feedback begins to be intermittent, or begins to deviate from the PCU command) would be considered by the signal monitoring module 306 (or alternatively a separate PCU actuator controller) as faulty.

The signal monitoring module 306 may also be configured to detect any discrepancy between the provided PCU command and the recorded response of the propeller 130. Any discrepancy between the provided governing current and the expected rate of change in propeller speed or blade angle would allow to detect that the PCU command is faulty (i.e. that the PCU command estimated for maintaining or reaching the propeller reference speed or a specific blade angle does not result in the expected propeller speed or blade angle).

The signal monitoring module 306 would consider the PCU command (and PCU feedback) as healthy if the signals are not detected as being faulty based on any of the pre-defined fault detection conditions described herein above.

In one embodiment, the controller 202 is a dual-channel controller. In this embodiment, when a faulty signal (i.e., a faulty sensor signal and/or a faulty PCU command) is detected using one channel (i.e. on an active channel) of the controller 202, the controller 202, and particularly the signal monitoring module 306, switches to the other channel (i.e. a standby channel) and obtains failure free sensor signal(s) and/or PCU command from this other channel. The signal monitoring module 306 then provides the failure-free sensor signal(s) and/or PCU command to the PCU failure detection module 308 for use by the PCU failure detection module 308 in detecting failure of the PCU 206.

As will be discussed further below, based on the failure-free signals it receives, the PCU failure detection module 308 compares the actual value of the propeller speed to the reference speed and/or compares the actual value of the propeller blade angle to the minimum blade angle. The comparison of the actual value of the propeller speed to the reference speed may include comparing the actual value of the rotational speed to the reference speed itself, to a value based thereon (e.g., 95% of the reference speed), to a range of values including the reference speed, and the like. Similarly, the comparison of the actual value of the propeller blade angle to the minimum blade angle may include comparing the actual value of the blade angle to the minimum blade angle itself, to a value based thereon (e.g., 95% of the minimum blade angle), a range of values including the minimum blade angle, and the like.

If it is determined, based on the comparison, that the actual propeller speed exceeds (e.g., by a predetermined amount, within a particular range, or the like) the reference speed and/or the actual blade angle is lower (e.g., by a predetermined amount, within a particular range, or the like) than the minimum blade angle, the PCU failure detection module 308 causes the PCU command to be adjusted to compensate for the exceedance of the reference speed and/or minimum blade angle. If further exceedance of the reference speed and/or minimum blade angle is detected in response to the adjusted PCU command being output, the PCU failure detection module 308 detects a failure of the PCU 206, i.e. that the blade angle actuator 208 is seized in a position where fluid is supplied to the propeller 130.

In particular, an initial PCU command may be output (e.g., by the controller 202 or generated using any suitable means) to adjust the blade angle in order to achieve acceleration of the propeller 130 to maintain the propeller 130 at reference speed. As described herein above, the initial PCU command may comprise instructions to increase the governing current of the actuator 208 (for increasing fluid flow to the propeller 130) in order to achieve acceleration of the propeller 130. Conversely, as described above, the initial PCU command may be output to adjust the blade angle in order to achieve deceleration of the propeller 130 to maintain the propeller 130 at reference speed. As described herein above, the initial PCU command may comprise instructions to decrease the governing current of the actuator 208 (for decreasing fluid flow to the propeller 130) in order to achieve deceleration of the propeller 130. If the actual value(s) of the propeller rotational speed and/or blade angle (obtained from the sensor signal(s)) indicate that, in response to the initial PCU command, the rotational speed of the propeller 130 exceeds (i.e. is greater than) the reference speed and/or the propeller blade angle exceeds (i.e. is lower than) the minimum blade angle, the PCU failure detection module 308 causes an adjusted PCU command to be output for reducing fluid flow to the propeller 130. If the subsequent actual value(s) of the propeller rotational speed and/or blade angle (obtained from the sensor signal(s)) indicate that, in response to the adjusted PCU command, the rotational speed of the propeller 130 continues to exceed the reference speed and/or the propeller blade angle continues to exceed the minimum blade angle, the PCU failure detection module 308 detects failure of the PCU 208.

In one embodiment, the PCU failure detection module 308 assesses whether the PCU failure condition has been persisting for a period of time greater than a pre-determined duration, referred to herein as a pre-defined "latch time". The latch time may vary depending on engine configuration and may be obtained by any suitable means, e.g. retrieved from a database, a memory, or other storage medium to which the controller 202 may be communicatively coupled. If it is determined that the condition has persisted for a period of time that exceeds the latch time, the PCU failure detection module 308 confirms that the PCU failure condition is indeed present.

As discussed herein above, in one embodiment where the controller 202 is a dual-channel controller, the PCU failure detection module 308 may be configured to confirm the detection criteria mentioned above on both controller channels. This may allow for improved robustness and for protection against incorrect or misleading detection of failure of the PCU 206. In other words, the PCU detection module 308 may be configured to request confirmation of the PCU failure detection conditions on both the first channel and the second channel. Confirmation from the second channel of the inability to actuate the actuator 208 for achieving propeller deceleration and/or of the inability to transition the propeller 130 to the desired blade angles would indeed confirm mechanical failure of the PCU 206 (as, in normal operation, any electrical failure of the first channel would be compensable by the second channel taking over upon detecting that the first channel is unable to govern the propeller 130).

Upon detection of failure of the PCU 206 (i.e. of the blade angle actuator 208 being seized at the open position in which pressurized fluid is supplied to the propeller 130), the output module 310 generates an alert (e.g., a warning indication or message) indicative of the failure. The warning indication is then provided to an aircraft output (reference 210 in FIG. 2), which may be part of an aircraft avionics system, for cockpit annunciation. Cockpit annunciation may be performed using any suitable means, such as by visual rendering of the warning indication on display(s) provided in the cockpit of the aircraft and/or audio output using any suitable audio output device provided in the aircraft. In one embodiment, the aircraft output 210 is an Aeronautical Radio Inc. (ARINC) output that uses the ARINC 429 data transfer standard for aircraft avionics to output the warning indication. Other data standards may also be used, such as ARINC 615, ARINC 717, and MIL-STD-1553.

As described herein above, the alert would be recognized by the pilot as indicative of the need to implement a proper accommodation procedure. Specifically, the pilot may be aware that deciding to shut down the engine 110 with failure of the actuator 208 would necessitate immediate landing to prevent full discharge of the aircraft battery. Alternatively, the pilot may decide on setting the engine power to the idle (or low) power range in order to maintain the drive to the electrical generator and ensure the engine 110 produces electrical power.

Figure 4:
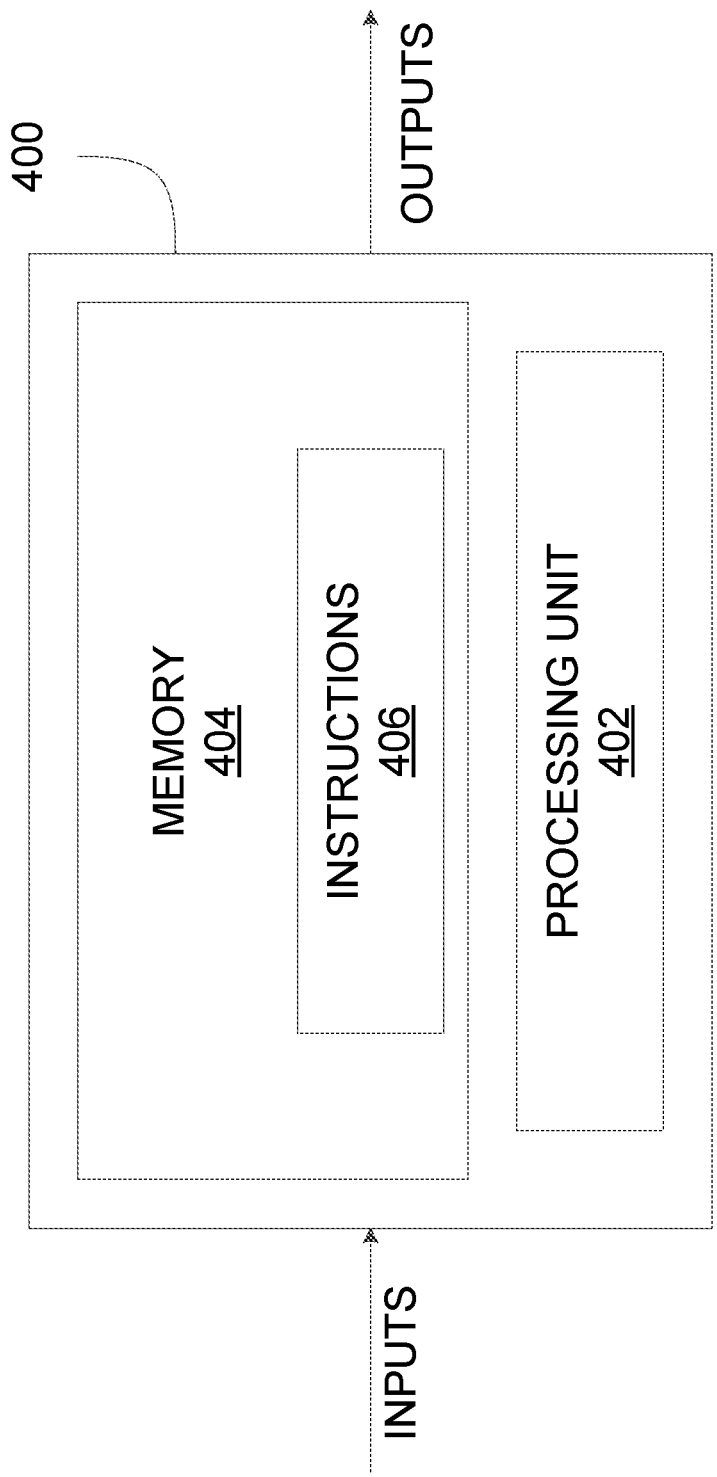
FIG. 4 is a block diagram of an example computing device for implementing the controller of FIG. 2, in accordance with an illustrative embodiment.

FIG. 4 is an example embodiment of a computing device 400 for implementing the controller 202 described above with reference to FIG. 2. The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause the functions/acts/steps specified in the method described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

Figure 5:
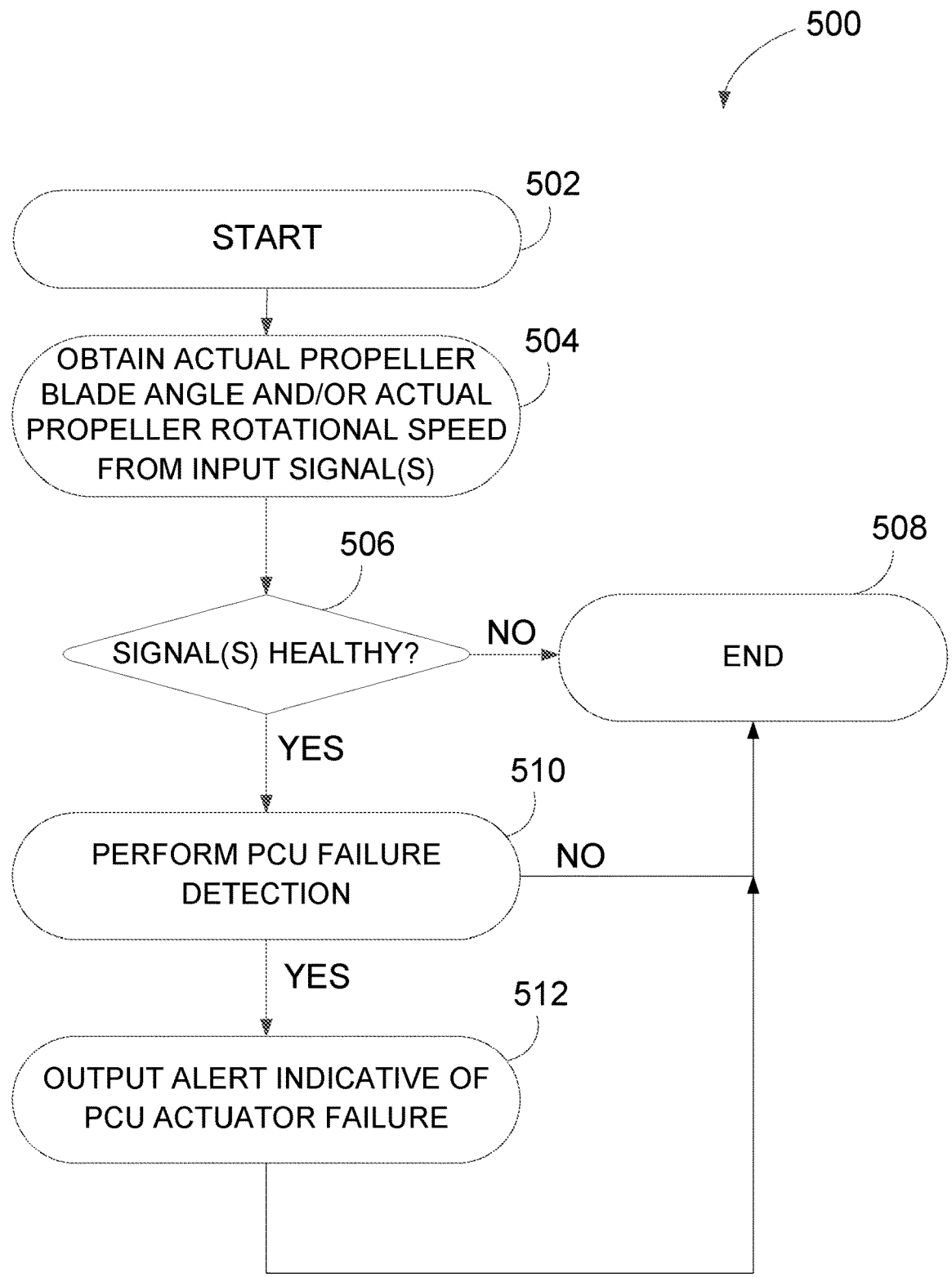
FIG. 5 is a flowchart of a method for detecting failure of a propeller control unit (PCU), in accordance with an illustrative embodiment.

Referring now to FIG. 5, a method 500 for detecting failure of a PCU will now be described in accordance with one embodiment. The method 500 is illustratively performed by a controller (such as the controller 202 in FIG. 2). After start (step 502), the method 500 proceeds to obtaining (step 504) an actual value of the blade angle and/or an actual value of the rotational speed of the propeller. The actual value of the propeller blade angle and/or rotational speed may be obtained from input signal(s) received from one or more sensor(s) coupled to the engine and/or the propeller, in the manner described herein above with reference to FIG. 2 and FIG. 3. As described above, in one embodiment, the controller 202 generates a PCU command needed to vary the position of the propeller blades in order to maintain the propeller at the reference speed and outputs the PCU command to the PCU (reference 206 in FIG. 2). In one embodiment, as discussed herein above, the controller 202 calculates the oil flow needed to obtain the desired propeller reference speed and generates the PCU command indicative of the governing current needed to achieve the desired oil flow. The input signal(s) are thus received (and the actual propeller blade angle and/or actual rotational speed obtained at step 504) in response to (i.e. a predetermined time delay after) the PCU command (or the adjusted PCU command described further below), continuously or at pre-determined time intervals.

The next step 506 comprises a determination as to whether the one or more signals obtained at steps 504 are healthy (i.e. within range and failure-free), in the manner described herein with reference to FIG. 2 and FIG. 3. In addition to assessing whether the input (i.e. sensor) signal(s) are healthy, step 506 may comprise assessing whether the PCU command is healthy (as discussed above). If it is determined at step 506 that the one or more signals are not healthy, the method 500 ends at step 508. Otherwise, the method 500 proceeds with performing PCU failure detection at step 510, based on the failure-free signal(s). When it is determined (at step 510) that the PCU is functioning properly, the method 500 may end at step 508. Otherwise, an alert indicative of failure of the PCU (i.e. indicating that the blade angle actuator is seized in the open position where fluid is supplied to the propeller) is output at step 512, e.g. for cockpit annunciation. The method 500 may then end at step 508.

Figure 6A:
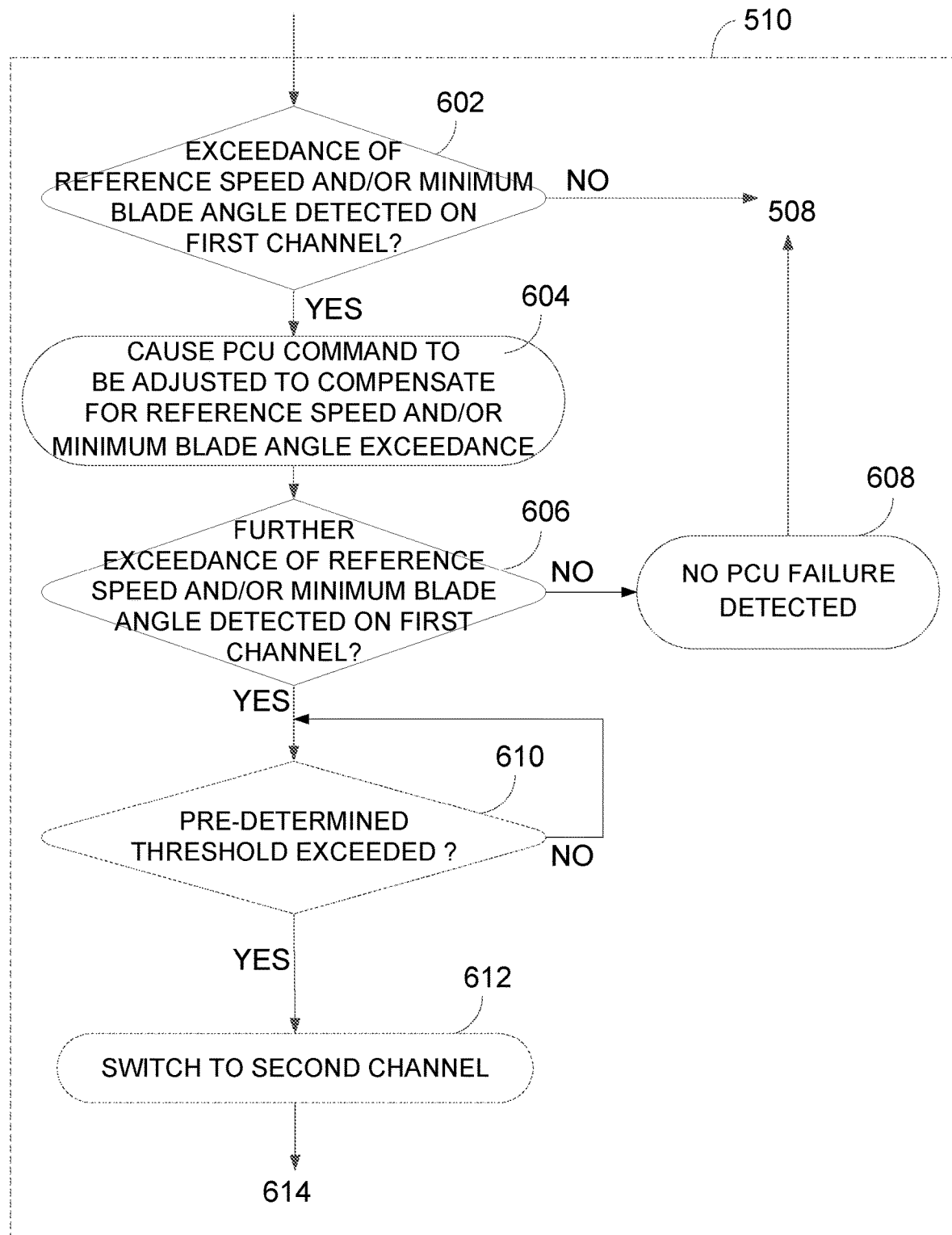
FIG. 6A and FIG. 6B are flowcharts of the step of FIG. 5 of performing PCU failure detection, in accordance with an illustrative embodiment.

Referring now to FIG. 6A in addition to FIG. 5, the step 510 of performing PCU failure detection comprises determining, at step 602, whether exceedance of the reference speed and/or the minimum blade angle has been detected on the first (i.e. active) controller channel. As described above with reference to FIG. 2 and FIG. 3, in one embodiment, step 602 comprises comparing the actual value of the propeller rotational speed (obtained at step 504) to the reference speed and determining whether the actual propeller speed exceeds (i.e. is above, by a predetermined amount, within a particular range, or the like) the reference speed, which would indicate that the propeller is currently overspeeding in response to the PCU command. In another embodiment, step 602 comprises comparing the actual value of the propeller blade angle (obtained at step 504) to the minimum blade angle and assessing whether the actual propeller blade angle exceeds (i.e. is below, by a predetermined amount, within a particular range, or the like) the minimum blade angle, which would indicate that the propeller is currently operating in the reverse range of blade angles in response to the PCU command.

If it is determined at step 602 that exceedance of the reference speed and/or minimum blade angle has not been detected on the first channel, the method 500 ends (step 508). Otherwise, if it is determined at step 602 that exceedance of the reference speed and/or the minimum blade angle has been detected, the next step 604 is to cause the PCU command to be modified for causing the PCU 206 to adjust the propeller blade angle in order to compensate for the speed and/or blade angle exceedance. In one embodiment, the PCU command is adjusted (e.g. by the controller 202) in order to decrease the rotational speed of the propeller and bring the rotational speed towards the reference speed. In another embodiment, the PCU command is adjusted in order to adjust (e.g., increase) the propeller blade angle so that the latter is above the minimum blade angle.

After the PCU command is caused to be adjusted (step 604) and output to the PCU 206, the next step 606 is to determining whether further exceedance of the reference speed and/or minimum blade angle has been detected on the first channel. Similarly to the assessment of step 602, the assessment of step 606 is illustratively performed on the basis of a subsequent actual value of the blade angle and/or rotational speed of the propeller, as obtained in the current clock cycle (step 504) from the input signal(s) received from the sensor(s) 204, in the manner described herein above with reference to FIG. 2 and FIG. 3. In some embodiments, a pre-determined time delay is permitted for the PCU 206 to adjust the blade angle in order to compensate for the speed and/or blade angle exceedance. As such, the subsequent actual value of the blade angle and/or rotational speed is obtained and the assessment of whether further exceedance of the reference speed and/or minimum blade angle has been detected on the first channel is only performed after the pre-determined time delay has elapsed. If it is determined at step 606 that further exceedance of the reference speed and/or minimum blade angle has not been detected in response to the adjusted PCU command being output, no PCU failure is detected (step 608) and the method 500 may end (step 508). Otherwise, it is determined at step 606 that further exceedance of the reference speed and/or minimum blade angle has been detected on the first channel in response to the adjusted PCU command being output.

In embodiments where a dual-channel controller is used to perform PCU failure detection, the method 500 may then proceed to detecting the PCU failure on a second (i.e. standby) channel. In one embodiment, the controller switches from the first channel to the second channel (to perform the PCU failure detection on the second channel) upon the rotational speed and/or the blade angle of the propeller exceeding a given pre-determined threshold. In other words, depending on whether the controller (reference 202 in FIG. 2) is a single- or dual-channel controller, the method 500 may optionally perform steps 610 to 618 described herein below. Step 610 may be to determine whether the pre-determined threshold has been exceeded. The threshold used to perform the assessment at step 610 is illustratively different from the reference speed and/or the minimum blade angle threshold used to perform the assessment at step 602. In one embodiment, the pre-determined threshold is a speed threshold, whose value is above the reference speed. The value of the speed threshold may vary depending on engine configuration. For example, with the reference speed set at 100%, the speed threshold may be set at any suitable value above 100%, such as 104% for example. Other suitable threshold values may apply. In another embodiment, the pre-determined threshold is a blade angle threshold, whose value is below the minimum blade angle and which may also vary depending on engine and propeller configuration.

Figure 6B:
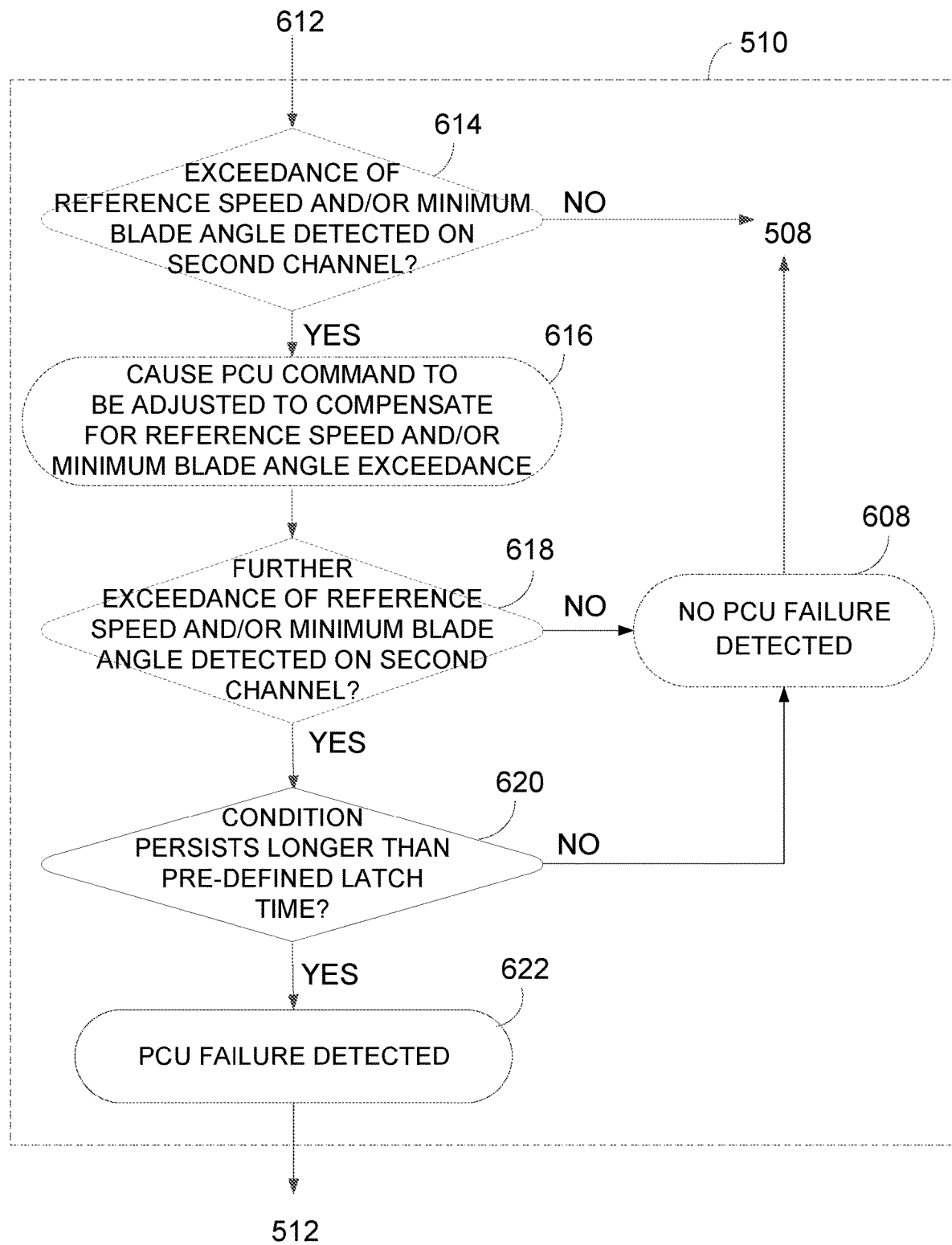

The assessment is performed at step 610 until it is determined that the pre-determined threshold has been exceeded (i.e. either the propeller rotational speed has increased further above the reference speed and is greater than the speed threshold and/or the propeller blade angle has decreased further below the minimum blade angle and is lower than the blade angle threshold), at which point the next step 612 is to switch to the second controller channel. Referring now to FIG. 6B in addition to FIG. 6A, the next step 614 is a determination as to whether exceedance of the reference speed or the minimum blade angle has been detected on the second channel. Similarly to step 602 of FIG. 6A, in one embodiment, step 614 comprises comparing the actual propeller rotational speed (obtained at step 504, in the current clock cycle) to the reference speed and determining whether the actual propeller speed exceeds (i.e. is above) the reference speed. In another embodiment, step 614 comprises comparing the actual propeller blade angle (obtained at step 504, in the current clock cycle) to the minimum blade angle and determining whether the actual propeller blade angle exceeds (i.e. is below) the minimum blade angle.

If it is determined at step 614 that exceedance of the reference speed and/or minimum blade angle has not been detected on the second channel (meaning that the second channel was able to bring propeller operation back to the reference speed or to a desired range of blade angles, such as above the minimum blade angle), the method 500 ends (step 508). Otherwise, if it is determined at step 614 that exceedance of the reference speed and/or the minimum blade angle has been detected, the next step 616 is to cause the PCU command to be adjusted in order to compensate for the speed and/or blade angle exceedance, in a manner similar to step 604 of FIG. 6A. After the PCU command is adjusted at step 616, it is output and the next step 618 is to determine (e.g., after the pre-determined time delay described above with reference to step 606 has elapsed) whether further exceedance of the reference speed and/or minimum blade angle has detected on the second channel. If this is not the case (meaning that it has been determined that further exceedance of the reference speed and/or minimum blade angle has not been detected in response to the PCU commands being adjusted and output via both the first channel and the second channel), no PCU failure is detected (step 608) and the method 500 may end (step 508).

Once it has been determined (on the first controller channel only for a single-channel controller or on both the first and second controller channels for a dual-channel controller) that, in response to the adjusted PCU command(s) (output via only the first controller channel or both the first and second controller channels), further exceedance of the reference speed and/or minimum blade angle has been detected, the next step 620 is to determine whether this condition (i.e. exceedance of the reference speed or minimum blade angle) has persisted for a period of time longer than (i.e. exceeding) a pre-defined latch time. If this is not the case, no PCU failure is detected (step 608) and the method 500 ends (step 508). Otherwise, if it is determined at step 620 that the reference speed and/or the blade angle threshold (e.g., the minimum blade angle) has been exceeded for a time period longer than the latch time, failure of the PCU is detected at step 622. An alert indicative of the PCU failure condition is then generated for output to the cockpit at step 512 (in the manner described herein above), which may allow for protection against potentially catastrophic aircraft risks (e.g., inadvertent unfeathering, overspeed, and reverse operation of the propeller) in flight.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A failure detection method for a propeller control unit coupled to a propeller, the method comprising:
   at a computing device,
   obtaining an actual value of at least one of a blade angle and a rotational speed of the propeller;
   performing a comparison between the actual value and a threshold;
   in response to determining, based on the comparison, that the actual value exceeds the threshold, causing the propeller control unit to adjust the blade angle to bring the at least one of the blade angle and the rotational speed towards the threshold;
   obtaining a subsequent actual value of the at least one of the blade angle and the rotational speed;
   determining, from the subsequent value, whether the at least one of the blade angle and the rotational speed has been brought towards the threshold; and
   in response to determining that the at least one of the blade angle and the rotational speed has failed to be brought towards the threshold, detecting failure of the propeller control unit and outputting an alert.

2. The method of claim 1, further comprising outputting at least one command to cause a fluid to be exchanged between a blade angle actuator of the propeller control unit and a source of the fluid for causing the propeller unit to adjust the blade angle.

3. The method of claim 2, wherein the detecting failure of the propeller control unit comprises detecting that the blade angle actuator is seized in an open position in which the fluid is supplied to the propeller.

4. The method of claim 2, wherein the at least one command is output to cause adjustment of a governing current that controls actuation of a valve operable to selectively fluidly connect the blade angle actuator with the source of the fluid.

5. The method of claim 2, further comprising:
   prior to obtaining the actual value of the at least one of the blade angle and the rotational speed of the propeller, outputting a first one of the at least one command for causing the propeller control unit to adjust the blade angle to maintain the rotational speed at a reference speed, wherein the performing the comparison between the actual value and the threshold comprises comparing the actual value of the rotational speed to the reference speed; and
   in response to determining, based on the comparison, that the actual value of the rotational speed exceeds the reference speed, outputting a second one of the at least one command for causing the propeller control unit to further adjust the blade angle to bring the rotational speed towards the reference speed.

6. The method of claim 5, further comprising comparing the subsequent actual value of the rotational speed to a speed threshold greater than the reference speed, wherein failure of the propeller control unit is detected in response to determining that the subsequent actual value of the rotational speed exceeds the speed threshold.

7. The method of claim 2, further comprising:
   prior to obtaining the actual value of the at least one of the blade angle and the rotational speed of the propeller, outputting a first one of the at least one command for causing the propeller control unit to adjust the blade angle of the propeller, wherein the performing the comparison between the actual value and the threshold comprises comparing the actual value of the blade angle to a minimum blade angle; and in response to determining, based on the comparison, that the actual value of the blade angle is below the minimum blade angle, outputting a second one of the at least one command for causing the propeller control unit to bring the blade angle towards the minimum blade angle, wherein failure of the propeller control unit is detected upon determining that, in response to the second one of the at least one command, the subsequent actual value of the blade angle is below the minimum blade angle.

8. The method of claim 1, wherein failure of the propeller control unit is detected in response to determining, on a first controller channel, that the at least one of the blade angle and the rotational speed has failed to be brought towards the threshold.

9. The method of claim 1, wherein failure of the propeller control unit is detected in response to determining, on both a first controller channel and a second controller channel, that the at least one of the blade angle and the rotational speed has failed to be brought towards the threshold.

10. The method of claim 1, further comprising determining a period of time during which the at least one of the blade angle and the rotational speed has failed to be brought towards the threshold, comparing the period of time to a pre-determined duration, and detecting failure of the propeller control unit in response to determining that the period of time exceeds the pre-determined duration.

11. The method of claim 1, wherein the outputting the alert comprises generating a warning message indicative of failure of the propeller control unit and outputting the warning message for cockpit annunciation.

12. A failure detection system for a propeller control unit coupled to a propeller, the system comprising:
a processing unit; and
a non-transitory computer readable medium having stored thereon program code executable by the processing unit for:
obtaining an actual value of at least one of a blade angle and a rotational speed of the propeller;
performing a comparison between the actual value and a threshold;
in response to determining, based on the comparison, that the actual value exceeds the threshold, causing the propeller control unit to adjust the blade angle to bring the at least one of the blade angle and the rotational speed towards the threshold;
obtaining a subsequent actual value of the at least one of the blade angle and the rotational speed;
determining, from the subsequent value, whether the at least one of the blade angle and the rotational speed has been brought towards the threshold; and
in response to determining that the at least one of the blade angle and the rotational speed has failed to be brought towards the threshold, detecting failure of the propeller control unit and outputting an alert.

13. The system of claim 12, wherein the program code is executable by the processing unit for outputting at least one command to cause a fluid to be exchanged between a blade angle actuator of the propeller control unit and a source of the fluid for causing the propeller unit to adjust the blade angle.

14. The system of claim 13, wherein the program code is executable by the processing unit for detecting failure of the propeller control unit comprising detecting that the blade angle actuator is seized in an open position in which the fluid is supplied to the propeller.

15. The system of claim 13, wherein the program code is executable by the processing unit for:
prior to obtaining the actual value of the at least one of the blade angle and the rotational speed of the propeller, outputting a first one of the at least one command for causing the propeller control unit to adjust the blade angle to maintain the rotational speed at a reference speed;
performing the comparison between the actual value of the rotational speed and the reference speed; and
in response to determining, based on the comparison, that the actual value of the rotational speed exceeds the reference speed, outputting a second one of the at least one command for causing the propeller control unit to further adjust the blade angle to bring the rotational speed towards the reference speed.

16. The system of claim 13, wherein the program code is executable by the processing unit for:
prior to obtaining the actual value of the at least one of the blade angle and the rotational speed of the propeller, outputting a first one of the at least one command for causing the propeller control unit to adjust the blade angle of the propeller;
performing the comparison between the actual value of the blade angle and a minimum blade angle;
in response to determining, based on the comparison, that the actual value of the blade angle is below the minimum blade angle, outputting a second one of the at least one command for causing the propeller control unit to bring the blade angle towards the minimum blade angle; and
detecting failure of the propeller control unit upon determining that, in response to the second one of the at least one command, the subsequent actual value of the blade angle is below the minimum blade angle.

17. The system of claim 12, wherein the program code is executable by the processing unit for detecting failure of the propeller control unit in response to determining, on one of, a first controller channel and both the first controller channel and a second controller channel, that the at least one of the blade angle and the rotational speed having failed to be brought towards the threshold.

18. The system of claim 12, further comprising determining a period of time during which the at least one of the blade angle and the rotational speed has failed to be brought towards the threshold, comparing the period of time to a pre-determined duration, and detecting failure of the propeller control unit in response to determining that the period of time exceeds the pre-determined duration.

19. The system of claim 12, wherein the program code is executable by the processing unit for outputting the alert comprising generating a warning message indicative of failure of the propeller control unit and outputting the warning message for cockpit annunciation.

20. A non-transitory computer-readable medium having stored thereon program instructions executable by a processor for failure detection for a propeller control unit coupled to a propeller, the program instructions configured for:
obtaining an actual value of at least one of a blade angle and a rotational speed of the propeller;
performing a comparison between the actual value and a threshold;
in response to determining, based on the comparison, that the actual value exceeds the threshold, causing the propeller control unit to adjust the blade angle to bring the at least one of the blade angle and the rotational speed towards the threshold;

obtaining a subsequent actual value of the at least one of the blade angle and the rotational speed;

determining, from the subsequent value, whether the at least one of the blade angle and the rotational speed has been brought towards the threshold; and in response to determining that the at least one of the blade angle and the rotational speed has failed to be brought towards the threshold, detecting failure of the propeller control unit and outputting an alert.

* * * * *